United States Patent [19]

Arai

[11] 4,034,336

[45] July 5, 1977

[54] ELECTRONIC MONITOR SYSTEM FOR AUTOMOBILES

[75] Inventor: Hiroshi Arai, Aichi, Japan

[73] Assignees: Toyota Jidosha Kogyo Kabushiki Kaisha; Nippon Denso Co., Ltd., both of Aichi, Japan

[22] Filed: Aug. 4, 1975

[21] Appl. No.: 601,801

[30] Foreign Application Priority Data

Aug. 13, 1974 Japan ............................ 49-92627

[52] U.S. Cl. .................. 340/52 F; 340/147 LP
[51] Int. Cl.² ........................................ G08B 19/00
[58] Field of Search ............. 340/52 F, 414, 415, 340/147 LP, 366 B, 27 R

[56] References Cited

UNITED STATES PATENTS

| 2,917,731 | 12/1959 | Rodgers | 340/27 R |
| 2,994,073 | 7/1961 | Pelovitz | 340/52 F |
| 3,798,596 | 3/1974 | Sumiyoshi et al. | 340/52 F |
| 3,839,701 | 10/1974 | Pomerantz | 340/52 F |
| 3,911,373 | 10/1975 | Ohtake et al. | 340/52 F |
| 3,942,166 | 3/1976 | Peral et al. | 340/415 |

Primary Examiner—Glen R. Swann, III
Attorney, Agent, or Firm—Spensley, Horn and Lubitz

[57] ABSTRACT

An electronic monitor system for automobiles warns the driver both by a flashing light or buzzer and by lighting an appropriate indicator light which tells the location if there is something wrong with any one of the functions located through the car, and includes circuitry which determines whether the function needs emergency care or not and manually-operated switch which triggers the circuitry to render the indication less bothersome if the defective function is one not requiring emergency care.

12 Claims, 9 Drawing Figures

ELECTRONIC MONITOR SYSTEM FOR AUTOMOBILES

BACKGROUND OF THE INVENTION

This invention relates to an electronic monitor system for automobiles and other vehicles, and more particularly to improvement in the monitor system which warns the driver both by flashing light or buzzer sounds and by appropriate indicator light which tells the location if there is something wrong with any one of various functions installed through the car.

Various functions are installed in different locations through the car, and care must be taken to keep the functions operating properly. These functions include all mechanically or electrically operated points and component parts thereof. It is generally known that the safety driving depends largely on the condition or proper operation of some important functions. These important functions include those for brake oil, engine oil and battery fluid levels, and various lights, for example.

There is known a centralized monitor system which warns the driver by a flashing light and by an indicator light if something wrong or abnormal occurs with any individual functions located at different points through the car. According to the known monitor system, there are provided sensors which monitor the operation of their respective functions, and a warning element located in the position coming in sight of the driver and actuated by signals from the sensors. If an abnormality is detected by a particular sensor, the sensor will produce an electrical signal which actuates the warning element to flash at regular intervals and also turns on an appropriate indicator light which tells the location so that the driver can be warned of the abnormality and the location.

It may be understood from the foregoing description that the known monitor system has an advantage since it provides centralized warning means which can warn the driver during the normal driving immediately if there is something wrong with any one of the functions located through the car, and can also let the driver know the location. However, it has been noted that the known monitor system has several problems from the practical standpoint. One major problem is that the warning action which is once triggered when a particular function as something wrong or abnormal cannot be cut off in any way. The warning action should not be interrupted as long as the function continues to operate improperly. However, it has become apparent that this continued warning signal may bother the driver who has been warned, and prevent him from driving with safety. Since the driver has been aware of the abnormality in this case, the warning action should preferably be cut off or interrupted. For example, flashing light or buzzer sounds will often place the driver on his nerves while he drives a distance to an appropriate place such as a service station.

There are some major functions that need emergency care or repair, and others that need no such care. It will be practically inconvenient if no means is provided by which the warning action can be released if there is something wrong with any one of the minor functions. Functions such as battery fluid level, windshield washer fluid level and tail lamps, for example, are not considered to be major problems in the event of failure. In such events, the driver will usually drive to a repair or service station. According to the known monitor system, in those cases, the driver must always be bothered by the flashing light or buzzing sounds until he arrives at the service station. If the service station should be located relatively remote, the flashing light or buzzer sounds will continue to annoy the driver during that distance. It will readily be understood that the known monitor system is disadvantageous from the safety standpoint.

The present invention has overcome the above disadvantages from the practical and safety standpoints. The monitor system according to the invention includes control circuit which regulates the strength of warning signals provided by a main warning apparatus. If there is something wrong with any minor function that needs no emergency care, the control circuit determines that it is a minor problem, and then works so that it weakens the strength of the warning signal provided by the warning apparatus without affecting the operation of the warning apparatus. The driver can thus be relieved of the flashing light or buzzer sounds that would otherwise bother him while driving to the service station for repair. The control circuit should be actuated as above, as far as the minor functions are concerned, but desirably should not be so actuated if there is something wrong with major functions such as brake oil level and brake lamp breakage or burn-out which may immediately lead to serious problems.

In order to satisfy those needs, discriminator circuit is provided which determines whether the functions need emergency care or not if an abnormality is detected. More particularly, the discriminator circuit works so that it selectively renders the action of the control circuit valid and invalid depending on the type or importance of the functions. If there should be something wrong with any major function while the strength of the warning signal is maintained to a lower level, the discriminator circuit will then be actuated immediately so that it renders the action of the control circuit invalid and restores the warning signal to its normal strength.

SUMMARY OF THE INVENTION

It is therefore a principal object of the present invention to provide an electronic monitor system for automobiles, including control circuit which is operated by a driver for lowering the strength of the level of warning signals provided by a main warning apparatus, if something wrong with any minor function is detected and determined as such.

It is another object of the present invention to provide an electronic monitor system, including discriminator circuit connected to the control circuit and which determines whether the function needs emergency care or not and actuates the control circuit to lessen the warning signal strength only if the function is less important.

Other objects and advantages of the invention will become apparent from the following specification and accompanying drawings.

DESCRIPTION OF THE PREFERRED EMBODIMENTS

Figure 1:
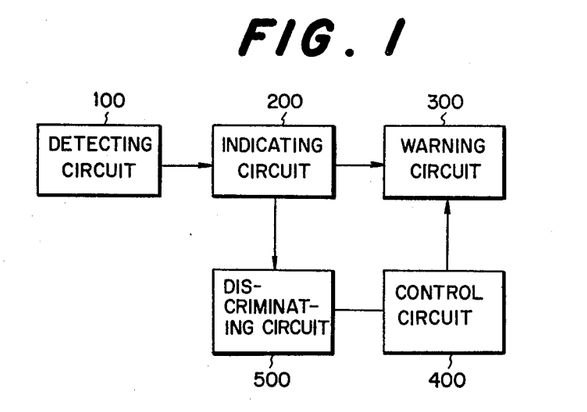
FIG. 1 is a block diagram showing the general arrangement of an electronic monitor system according to the present invention.

The present invention will be further described by way of several preferred embodiments thereof with reference to the accompanying drawings in which:

Referring first to FIG. 1, there is given a schematic diagram which shows the general construction of an electronic monitor system according to the invention. A detecting or sensing circuit 100 is generally shown in FIG. 1, which consists of a number of sensors located in different locations which correspond to various functions installed through the car and quickly responsive to any abnormal situation of their corresponding functions for producing electrical signals. Signals from the circuit 100 or individual sensors are applied to an indicating circuit 200 which lights an appropriate indicator light for telling the location. More particularly, if an abnormality is detected by a particular sensor which produces a signal, the indicating circuit 200 is then actuated for lighting an appropriate indicator light which tells the location, and also supplies a signal to a warning circuit 300 which turns on a flashing light or buzzer for warning. The warning circuit 300 is connected to a control circuit 400 which regulates the strength of the warning signal provided by the circuit 300 in accordance with different emergency needs. The control circuit 400 is operated under the command or control of a discriminator circuit 500 which selectively renders the action of the circuit 400 valid and invalid depending on the different situation. The circuit 500 cooperates with the indicating circuit 200 so that it can determine whether the function requires emergency care or not.

Figure 2:
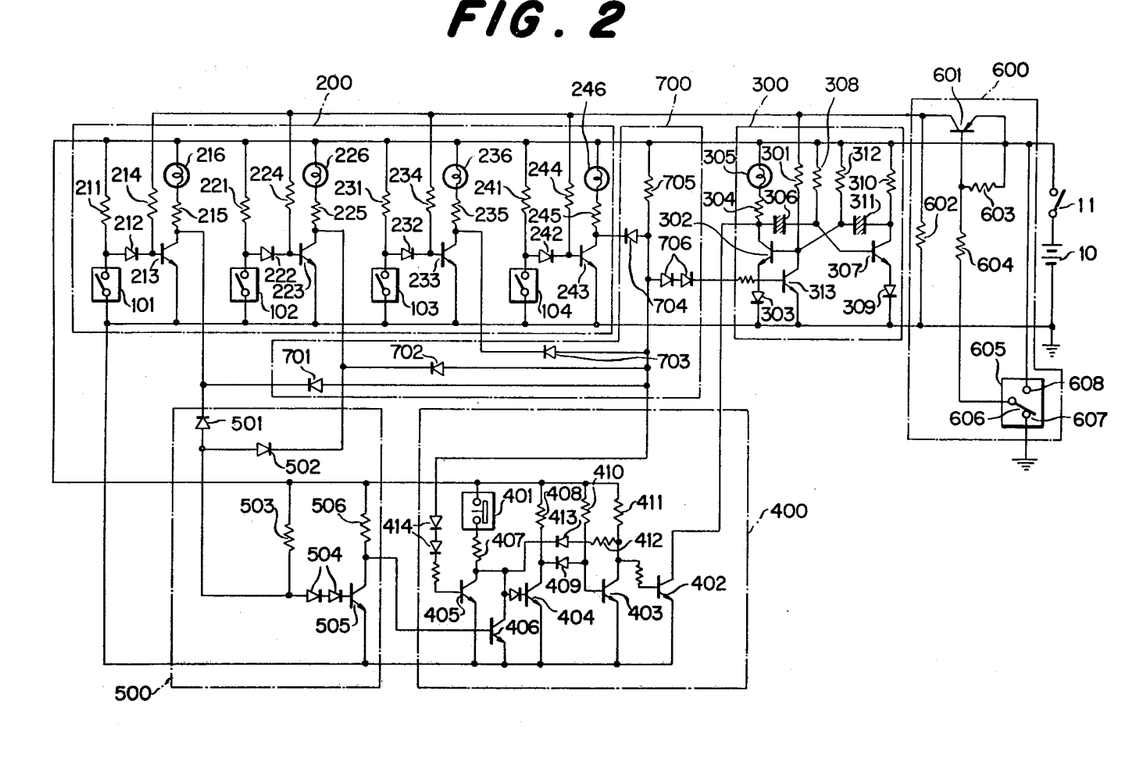
FIG. 2 is a schematic diagram showing details of the circuit arrangement of FIG. 1.

FIG. 2 is a schematic diagram which shows the circuit arrangement of FIG. 1 in further details. A sensor 101 is provided for monitoring brake oil level, for example, and includes electrical switching means which is held on when the oil level stays above a given value and is turned off if the level falls below the value. The sensor 101 has one terminal earthed to the ground and the other terminal connected through a resistor 211 to the positive electrode of a power supply or battery 10. An ignition key switch 11 is connected in series with the power supply 10. The sensor 101 and resistor 211 have an intermediate point between them which leads through a diode 212 to the base of a transistor 213. The base of the transistor 213 is further connected to a resistor 214. The emitter of the transistor 213 is grounded, and its collector leads through a resistor 215 and indicator light 216 to the positive electrode of the supply 10. The circuit arrangement for the sensor 101 is thus provided which will turn on the appropriate indicator light for telling the location if there is something wrong with the brake oil level.

Similarly, a sensor 102 is provided for monitoring a brake lamp, and includes electrical switching means which is held on when the lamp is operating properly and is turned off if breakage or burn-out is detected. The sensor 102 leads to its corresponding indicating circuit which will turns on the indicator light that tells the location if the brake light fails. The indicating circuit has the same arrangement as that of the sensor 101, and includes a transistor 223, indicator light 226, diode 222 and resistors 221, 224 and 225.

A sensor 103 is also provided for detecting battery fluid level, and includes electrical switching means which is held on when the fluid level is above a given value and is turned off if the level falls below the value. The sensor 103 leads to its corresponding indicating circuit whose indicator light will tell the location if the fluid level falls. The circuit is also arranged like those of the sensors 101 and 102, and includes a transistor 233, indicator light 236, diode 232, and resistors 231, 234 and 235.

A sensor 104 is further provided for monitoring windshield washer fluid level, and includes electrical switching means which is held on when the fluid level is above a given value and is turned off if the level falls below the value. The sensor 104 leads to its corresponding indicating circuit whose indicator light will tell the location if an abnormality is detected. The circuit is also constructed like those of the sensors 101, 102 and 103, and includes a transistor 243, indicator light 246, diode 242 and resistors 241, 244 and 245.

In the embodiment described above, there are provided four sensors which correspond to the four different functions installed through the car. As easily noted, additional sensors may be provided whose number depends on the number of functions to be monitored.

The resistors 214, 224, 234 and 244 arranged in their respective indicating circuits, generally shown at 200, have terminals connected to a common line which leads to the collector of a transistor 601 provided in an engine-start monitoring circuit 600 and is also grounded through a resistor 602. The emitter of the transistor 601 leads to the positive electrode of the power supply 10 while its base is connected through a resistor 603 to the positive electrode of the supply 10 and also through a resistor 604 to a common contact 606 of a start relay 605. The start relay 605 is energized by the action of its relay coil which is connected to a charging generator. When the generator remains to be non-energized, and so does not supply voltages, the start relay 605 has its common contact 606 biased toward a first contact 607 so that it is at ground potential. As the generator is energized so that it supplies voltages, the common contact 606 will then make contact with a second contact 608 so that it is at supply potential.

The collector of the transistor 601 in the circuit 600 is connected through a resistor 301 of the warning circuit 300 to the base of a transistor 302 provided in the circuit 300. The emitter of the transistor 302 is grounded through a diode 303, and its collector leads through a resistor 304 and a warning light 305 to the positive electrode of the power supply 10. The collector of the transistor 302 is further connected through a capacitor 306 to the base of a transistor 307 which in turn leads through a resistor 308 to the positive electrode of the supply 10. The emitter of the transistor 307 is grounded through a diode 309, and its collector leads through a resistor 310 to the positive electrode of the supply 10. The collector of the transistor 307 is further connected through a capacitor 311 to the base of the transistor 302, and the base of the transistor 302 leads through a resistor 312 to the positive electrode of the supply 10.

It will be understood from the foregoing description that the warning circuit 300 works generally as a non-stable multivibrator, flashing the warning light 305 at constant intervals. A transistor 313 is connected to a point between the base of the transistor 302 and the ground terminal, and its base leads to an output terminal of an OR circuit 700. The OR circuit 700 will provide an output signal if there is something wrong with at least any one of the functions. In the embodiment shown for example, the OR circuit 700 is actuated according to potential changes that the transistors 213, 223, 233 and 243 will have at the collectors thereof as the sensors 101, 102, 103 and 104 are turned on and off. As particularly shown in FIG. 2, the collectors of the transistors 213, 223, 233 and 243 are connected to the corresponding diodes 701, 702, 703 and 704 whose anodes are connected to a common terminal which leads through a resistor 705 to the positive electrode of the power supply 10. The common terminal is also connected through a diode 706 to the base of the transistor 313 provided in the circuit 300.

When the ignition key switch 11 is turned on so that the car is ready, voltage from the power supply 10 is applied to all circuits described above.

Check should preferably be made to make certain that the monitor system itself is operating properly before driving the car. If defective indicator lights or warning flash lamp, among others, should be left unnoticed, it may place the driver in an extremely dangerous situation since no appropriate indication is provided if an abnormality is detected. It is therefore very important that those lights should be checked for failure beforehand. The engine-start monitoring circuit 600 earlier referred to can satisfy those needs best. It has been described that at the time the ignition key switch 11 is turned on, the charging generator is not ready for revolution so that the common contact 606 of the start relay 605 is biased toward the first contact 607 by the action of the known relay coil, as shown in FIG. 2. In this state, therefore, bias current of the amount controlled by the resistors 603 and 604 flows through the base of the transistor 601, turning on the transistor 601. As a result, collector current of the transistor 601 is fed through the resistors 214, 224, 234 and 244 into the bases of the transistors 213, 223, 233 and 243. Feeding the bias current causes the transistors 213, 223, 233 and 243 to be turned on so that their respective indicator lights are energized for lighting. In this manner, each indicator light can be checked for burn-out or breakage. The diodes 212, 222, 232 and 242 connected to the bases of the corresponding transistors 213, 223, 233 and 243 can prevent bias current from flowing back into the sensors 101, 102, 103 and 104.

The collector current of the transistor 601 is also fed through the resistor 301 into the base of the transistor 302, turning on the transistor 302 which supplies current to the warning light 305. In this manner, the warning light 305 can be checked for breakage or burn-out.

If it is found that all indicator lights and flash light are operating properly, the generator is then energized for rotation. Rotation of the generator causes the relay coil to be energized so that the common contact 606 of the start relay 605 is switched over for making contact with the second contact 608. As a result, the base of the transistor 601 will have a voltage rise to near supply potential which turns on the transistor 601. The bases of all transistors 213, 223, 233 and 243, and the base of the transistor 302 are then grounded through the resistor 602, cutting off the transistors 213, 223, 233, 243 and 302.

All sensors 101, 102, 103 and 104 are held "on" as long as their corresponding functions are operating properly. In this state, the transistors 213, 223, 233 and 243 always have a voltage near to ground potential at the bases thereof, cutting off the transistors 213, 223, 233 and 243 so that all indicator lights 216, 226, 236 and 246 remain to be off. While all transistors 213, 223, 233 and 243 are held "off", no current flows through the resistor 705 of the OR circuit 700, causing the transistor 313 to have a voltage rise to near supply potential at the base thereof which turns on the transistor 313. In the meantime, the base of the transistor 302 in the circuit 300 is grounded through the transistor 313, cutting off the transistor 302. As the transistor 313 is held on, it will restrain the non-stable multivibrator or circuit 300 from oscillating, holding the warning light 305 off.

The following describes cases where an abnormality is detected with any one of the functions. Suppose then that the battery fluid level falls below a given value. As the sensor 103 detects the fall, it will then be turned off so that the base voltage of the transistor 233 will immediately rise to near supply potential. This causes the transistor 233 to be turned on so that current can flow through the collector for turning on the indicator light 236 which tells that the fluid level falls. As the transistor 233 is turned on, its collector voltage drops to near ground potential so that current can flow through the diode 703 into the resistor 705 of the OR circuit 700. The output voltage of the OR circuit 700 will then drop to near ground potential, turning off the transistor 313 in the warning circuit 300 which sets the transistor 302 free from its action which has restrained the circuit 300 from oscillation. This results that the circuit 300 will again work as a non-stable multivibrator which provides oscillations for flashing the warning light 305 at constant intervals.

It will readily be understood from the above description that if there is something wrong with any one of the functions, the corresponding sensor detects it, supplying a signal which turns on both the appropriate indicator light and the flash light by which the driver can be warned without error.

The control circuit 400 earlier referred to will now be described in further details. One embodiment of the control circuit 400 is shown in FIG. 2, in which the strength of the warning signal provided by the warning circuit 300 can be lowered so that the warning light 305 can be made to stay on continuously. As particularly seen from FIG. 2, the control circuit 400 consists of a triggerable switch 401 which is operated for lowering the warning signal strength, a transistor 402 which provides bypass for the warning light 305, transistors 403 and 404 which control the on and off inverting action of the transistor 402 and are actuated for keeping themselves latched on, a transistor 405 which holds the transistor 404 off when all functions are operating properly, and a transistor 406 which will hold the transistor 404 off if an instruction is received from the discriminator circuit 500 which will be described later.

Figure 3:
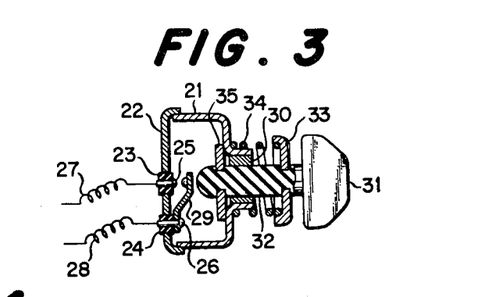
FIG. 3 is a sectional view showing the internal construction of a triggerable switch best suited for the present invention.

The construction of the triggerable switch 401 is shown in details in FIG. 3. A housing 21 is rigidly mounted in position on a front panel of the driver's seat, for example, and has an open end to which a contact holding member 22 is rigidly secured. The member 22 has contacts 25 and 26 rigidly secured thereto by means of non-conductive rings 23 and 24, respectively. Each of the contacts 25 and 26 leads through lead wires 27 and 28 to the control circuit 400 shown in FIG. 2. A movable contact 29 of resilient material has one end thereof rigidly secured to one of the contacts, shown at 26, and the other end swingably provided in a properly spaced relation to the other contact shown at 25. A bearing 30 is rigidly secured to the housing 21 and supports a non-conductive rod member 32 for sliding movement, the member 32 having a portion in the form of a push button 31. A compression coil spring 34 is disposed between a flanged member 33 rigidly secured to the rod member 32 and the housing 21. A stopper member 35 is rigidly secured to that insertion side of the rod member 32 which exists inside the housing 21.

As clearly seen from FIG. 3, the rod member 32 is normally biased away from the movable contact 25 by the action of the spring 34 so that the triggerable switch 401 is in the off position. Depression of the push button 31 moves the rod member 32 forward, causing the movable contact 29 to make contact with the contact 25 so that the circuit is completed for rendering the switch 401 conductive or in the on position. When the depressed button 31 is released, it causes the switch 401 to be cut off again.

Referring back to FIG. 2, the triggerable switch 401 has one terminal thereof connected to the positive electrode of the power supply 10, and the other terminal connected through the resistor 407 to the base of the transistor 404. The emitter of the transistor 404 is connected through resistor 408 to the positive electrode of the supply 10, and its collector leads through diode 409 and resistor 410 to the positive electrode of the supply 10. The intermediate point between the diode 409 and resistor 410 leads to the base of the transistor 403. The emitter of the transistor 403 is grounded, and its collector leads through resistor 411 to the positive electrode of the power supply 10 and also to the base of the transistor 402. The emitter of the transistor 402 is grounded, and its collector leads to the other terminal of the resistor 304 in the warning circuit 300. The collector of the transistor 403 leads through resistor 412 and diode 413 to the base of the transistor 404. The base of the transistor 404 is further connected to the collector of the transistor 405. The emitter of the transistor 405 is grounded, and its base receives output signals of the OR circuit 700 through diode 414. The base of the transistor 404 leads to the collector of the transistor 406 whose emitter is grounded and whose base receives output signals of the discriminator circuit 500.

The following describes the manner in which the control circuit 400 operates. It should be noted that the transistor 406 is held in the off position unless it receives an instruction from the discriminator circuit 500. The OR circuit 700 provides a high-potential output when all functions are operating properly. This results that the transistor 405 will have a base current which turns on the transistor 405, and its collector voltage will drop to near ground potential, turning off the transistor 404. As the transistor 404 is turned off, its collector voltage rises to near supply potential, cutting off the transistor 403. As the transistor 403 is turned off, its base voltage drops to near ground potential, cutting off the transistor 402.

As noted above, when all functions are operating properly, the transistors 404 and 402 are held in the off position even though the triggerable switch 401 is activated, so that the transistor 402 will not provided bypass for the warning light 305.

Suppose sensor 103 is then turned off. As noted above in this case, the indicator light 236 is turned on, and the warning light 305 is also turned on for flashing at intervals. The output voltage drop of the OR circuit 700 causes the transistor 405 to turn off. In this state, however, current still flows through the base of the transistor 404 and through the resistor 411, so that the transistor 404 remains to be off, the transistor 403 on and the transistor 402 off. Therefore, the control circuit 400 will not affect the operation of the flashing light 305.

When the triggerable switch 401 is actuated by depressing the push button 31, the strength of the warning signal provided by the warning circuit 300 will be lowered in the following manner. Actuating the triggerable switch 401 causes the base voltage of the transistor 404 to rise to near supply potential so that current can flow into the base of the transistor 404. As the transistor 404 is then turned on, the base voltage of the transistor 403 drops, cutting off the transistor 403. Cutting off the transistor 403 then causes the voltage at the base of the transistor 402 to rise so that current can flow through the base of the transistor 402, turning on the transistor 402. As the collector of the transistor 402 leads through resistor 304 and warning light 305 to the positive electrode of the power supply 10, the transistor 402 can provide a bypass for the warning light 305 as it turns on. As a result, the warning light 305 will stay on continuously but not flash despite the oscillations that the warning circuit 300 provides. In this manner, the driver can be relieved from the blinking action of the light 305 which would otherwise bother him. It should also be noted that the transistor 402 can be held on by the self-latching action that the transistors 403 and 404 provide, even after the triggerable switch 401 is restored to the off position.

As clearly seen from the foregoing description, the monitor system according to the invention provides means which allows the driver to operate the triggerable switch after he is warned by the appropriate indicator light which tells a minor function fails, so that the strength of the warning signal can be lowered to turn the flashing light 305 into lighting on continuously.

The description given so far concerns cases where minor functions have something wrong such as battery fluid shortage, for example. In the following description, there are shown cases where something wrong occurs with any other major function while the warning signal has its strength controlled to a lower level. As noted earlier, there is provided the discriminator circuit 500 which will render the action of the control circuit 400 invalid if there is something wrong with any major function. The discriminator circuit 500 includes and OR circuit which consists of diodes 501 and 502 whose cathodes lead to the collectors of their respective transistors 213 and 223 which correspond to the major functions. The anodes of the diodes 501 and 502 are connected to a common terminal which leads through resistor 503 to the positive electrode of the power supply 10 and also through diode 504 to the base of a transistor 505. The emitter of the transistor 505 is grounded, and its collector leads through resistor 506 to the positive electrode of the supply 10 and also to the base of the transistor 406 of the control circuit 400. When the transistors 213 and 223 turn off, the voltage at the base of the transistor 505 rises to near supply potential, so that base current can flow through the transistor 505, turning on the transistor 505. This causes the voltage at the collector of the transistor 505 to drop to near ground potential, holding the transistor 406 in the circuit 400 in the off position.

Suppose now that there is something wrong with any major function such as brake oil level which has a fall below a given value. When the sensor 101 detects this fall, and is then switched off, it will cause the transistor 213 to turn on for lighting the indicator light 216. As the transistor 213 is turned on, it also permits current to pass through diode 501 and into resistor 503. As a result, the voltage at the base of the transistor 505 drops to near ground potential, turning off the transistor 505. The base voltage of the transistor 406 then rises to near supply potential, causing the transistor 406 to conduct. Turning on the transistor 406 will ensure that the transistor 404 is turned off, the transistor 403 on and the transistor 402 off even if any other conditions exist. As a result, the warning light 305, which has been kept lighting on by the transistor 402 held on by the switch 401, will again be controlled by the warning circuit 300 which provides oscillating signals as the transistor 402 is turned off, and will again start flashing. In this condition, the light 305 will not be turned into lighting on continuously since the discriminator circuit 500 has already invalidated the action of the control circuit 400.

Figures 4, 5:
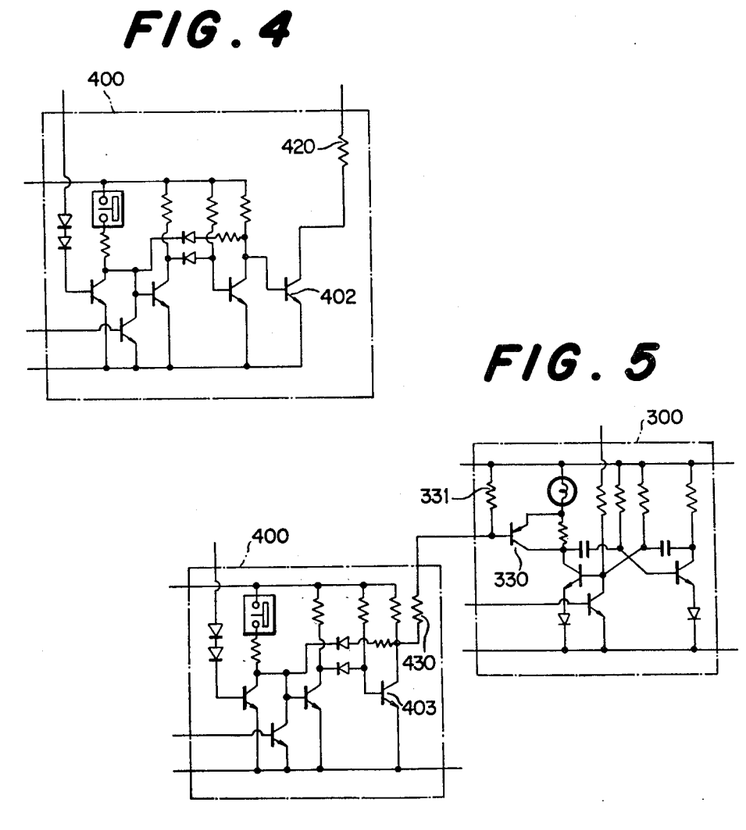
FIG. 4 is a schematic diagram showing another main circuit arrangement according to the invention.
FIG. 5 is a schematic diagram showing a third main circuit arrangement according to the invention.

FIG. 4 indicates a second preferred embodiment of the control circuit according to the invention. The control circuit of FIG. 4 is constructed almost like the earlier embodiment of FIG. 2, and includes circuit elements which are shown by same reference numerals as shown in FIG. 2. It operates in the same manner, however, it should be noted that the control circuit of FIG. 4 differs from that of FIG. 2 in that it has a resistor 420 connected to the collector of the transistor 402. This arrangement permits the flashing light 305 to be turned into lighting on continuously and with less brightness.

A third preferred embodiment of the control circuit is shown in FIG. 5, and has a similar arrangement to FIG. 2. It includes circuit elements which are shown by same reference numerals as shown in FIG. 2, and operates in the same manner. A transistor 330 is shown in FIG. 5, whose emitter and collector are connected to their corresponding terminals of the resistor 304 in the circuit 300. The base of the transistor 330 leads through resistor 331 to the positive electrode of the power supply 10 and also through resistor 430 to the collector of the transistor 403. As noted from FIG. 5, it does not include such a transistor as shown in 402 in FIG. 2.

As illustrated with reference to FIG. 2, the transistor 403 is operating on unless the control circuit 400 provides a lower-level warning signal. In this state, therefore, the transistor 330 is turned on so that current can flow through the warning light 305 into the transistor 330 whose resistance is lower than the resistor 304.

The transistors 403 and 330 are turned off if the control circuit 400 provides a lower-level warning signal so that current can flow through the warning light 305 into the resistor 304 of higher resistance, causing the light 305 to stay on continuously and with less brightness.

Figure 6:
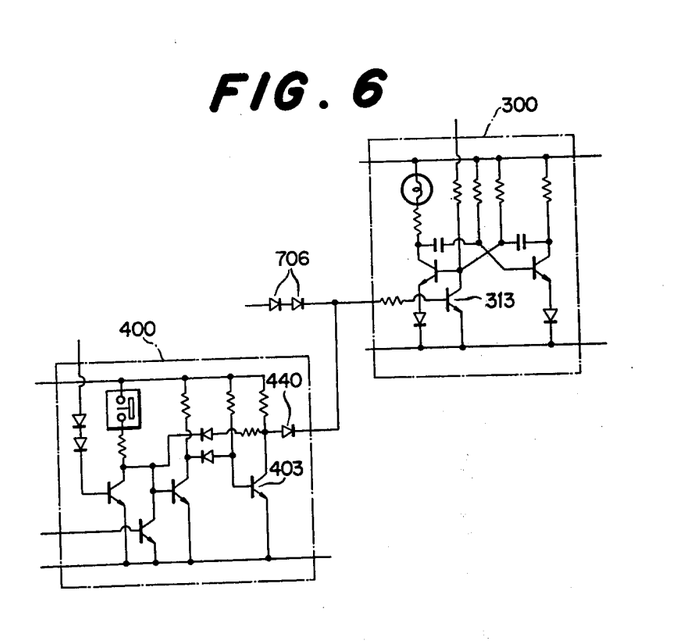
FIG. 6 is a schematic diagram showing a fourth main circuit arrangement according to the invention.

A fourth preferred embodiment of the control circuit is shown in FIG. 6, and has a similar arrangement to FIG. 2. It includes circuit elements which are shown by same reference numerals as shown in FIG. 2, and operates in the same manner. As shown in FIG. 6, the collector of the transistor 403 is connected through diode 440 to the base of the transistor 313. In this embodiment, actuating the triggerable switch 401 causes the transistor 402 to be switched from on to off, turning on the transistor 313 so that the warning light 305 is turned off.

In the embodiments described heretofore, the warning element is provided in the form of a warning light, but may be replaced by buzzer sound means.

Figure 7:
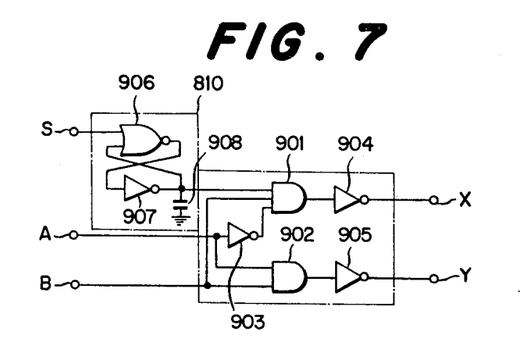
FIG. 7 is a logical circuit diagram of a still another embodiment of the invention.
Figure 8:
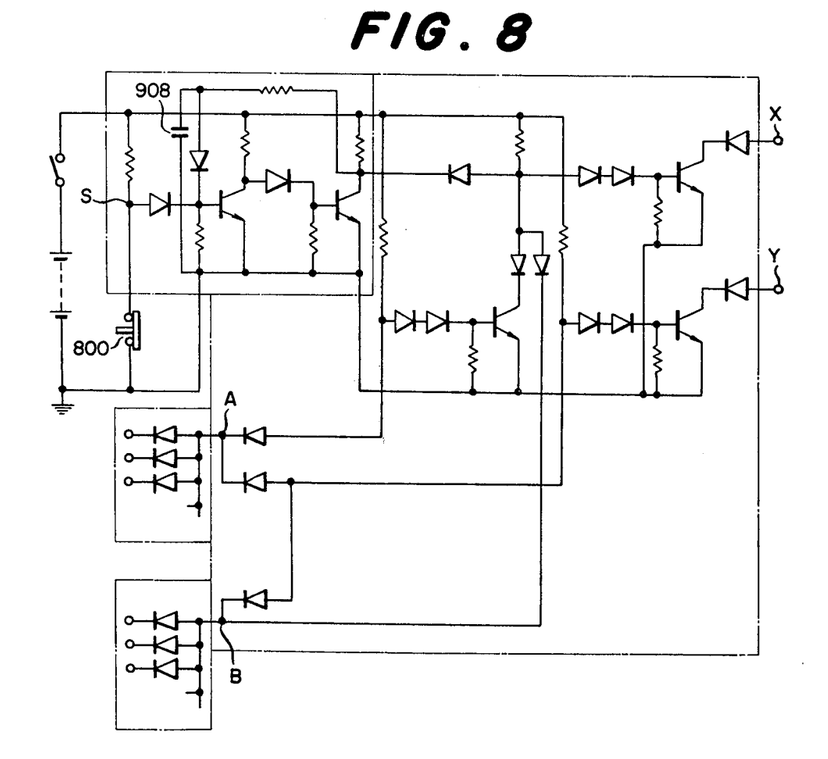
FIG. 8 is a detailed circuit arrangement diagram of FIG. 7.

FIGS. 7 and 8 indicate a still another preferred embodiment of the invention, in which distinctly-different warning signals can be produced if there is something wrong with several functions of different importance or emergency care. For the convenience of easy understanding, suppose that the various functions are grouped into two, one including the minor functions and the other including the major functions, two distinctly-different signals A and B are supplied which correspond to the functions of the two different groups, respectively, and the triggerable switch 800 provides a signal S when it is depressed so that it can lower the strength of the warning light or buzzer.

Referring first to FIG. 7, suppose that the two input signals A and B correspond to the two functions of the two different groups, and assume the logic states $A = 1$, $B = 1$, respectively, if the two functions operate properly, and assume the logic states $A = 0$, $B = 0$ if the two functions operate improperly. The input signal A corresponds to the detect signal derived from the function of less importance, and the input signal B corresponds to the detect signal derived from the function of greater importance. In the normal situation, the signal S assumes the logic state $S = 0$, but it will assume the logic state $S = 1$ if the triggerable switch 800 is depressed by the driver at an appropriate time.

As shown in the truth table given below, the logical relationships of the three input signals A, B and S can be expressed by eight combinations of those signals.

| A | B | S | X | Y | Warning Light (Buzzer) |
|---|---|---|---|---|---|
| 0 | 0 | 0 | 1 | 1 | flash |
| 0 | 0 | 1 | 1 | 1 | flash |
| 0 | 1 | 0 | 1 | 1 | flash |
| 0 | 1 | 1 | 0 | 1 | on |
| 1 | 0 | 0 | 1 | 1 | flash |
| 1 | 0 | 1 | 1 | 1 | flash |
| 1 | 1 | 0 | 1 | 0 | off |
| 1 | 1 | 1 | 1 | 0 | off |

The results of the operation on the input signals A, B and S in the above truth table are given as $$X = \overline{A} . B . S \quad \text{and} \quad Y = A . B ,$$

and the logical relationships can be represented symbolically as shown in the logical circuit diagram of FIG.

7. The detailed arrangement of the logical circuit of FIG. 7 is shown in FIG. 8.

In FIG. 7, reference numerals denote AND-gates, reference numerals 903, 904 and 905 inverters, reference numeral 906 NOR-gate, reference numeral 907 inverter, and reference numeral 908 capacitor. As particularly shown in FIG. 7, the output of the NOR-gate 906 leads to the input of the inverter 907 whose output leads to the input of the NOR-gate 906 and also to the input of the AND-gate 901. The output of the AND-gate 901 further leads to the input of the inverter 904 whose output leads to the input of the AND-gate 901. The output of the AND-gate 902 leads to the input of the inverter 905. Thus, the input signal S is applied to the input of the NOR-gate 906, the input signal A is applied to the input of the inverter 903 and also to the input of the AND-gate 902, and the input signal B is applied to the input of the AND-gate 901 and also to the input of the AND-gate 902.

In accordance with the logical circuit arrangement illustrated above and shown in FIG. 7, the logical relationships shown in the above truth table can be realized.

Figure 9:
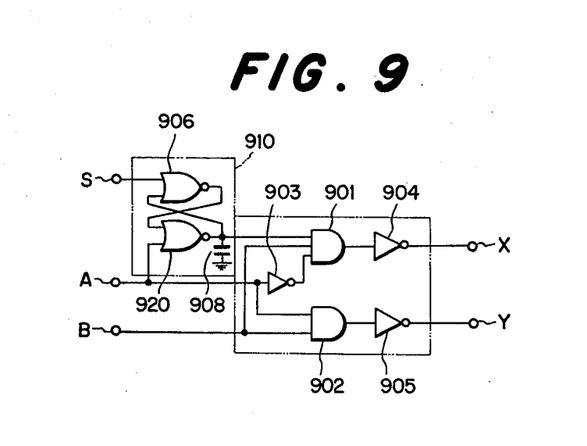
FIG. 9 is a logical circuit diagram of a still further embodiment of the invention.

FIG. 9 indicates a still further preferred embodiment similar to the earlier embodiment shown in FIGS. 7 and 8. In FIG. 9, however, it is so arranged that the memory circuit 910 can be reset each time the input signal A which corresponds to the function of less importance assumes a logical state of 1. As shown in FIG. 9, the memory circuit 910 has a NOR-gate 920 instead of the inverter 907 of the memory circuit 810 in FIG. 7.

In accordance with the circuit arrangement of FIG. 9 described above, suppose that there is something wrong with any one of the minor functions and the triggerable switch 800 is then depressed. Then, the appropriate indicator light turns on, and keeps on lighting. When the repair of the function is completed, returning it to normal, the signal A is then restored to the state of 1, resetting the memory circuit 910 to zero. Consequently, the memory circuit 910 provides an output signal of 0 state, causing the AND-gate 901 to close so that the main warning apparatus can automatically be placed in the "stand-by" condition. This means that the main warning apparatus is now ready to turn on a flash light whenever there is something wrong with any one of other functions.

As has been illustrated in details, the present invention provides improved electronic monitor system which includes means which can determine whether the function is important and requires emergency care or not if there is something wrong with any one of the various functions installed through the automobile, lowering the strength of the warning signal provided by the main warning apparatus if it needs no emergency care, and can also restore the strength of the warning signal to normal if in the meantime something wrong is detected with any one of the major functions.

Though the invention has been described with reference to several preferred embodiments thereof, it should be understood that various changes and modifications may be made without departing from the scope and spirit of the invention.

What is claimed is:

1. An electronic monitor system for automobiles, which comprises:
    a plurality of defect sensing means located at different locations within said automobile for sensing a defect in various functions throughout the automobile, and for producing a signal whenever there is a defect in a sensed function;
    a plurality of indicating circuit means for indicating a defect in one of said sensed functions, each of said indicating circuit means being responsive to one of said signals produced by said plurality of defect sensing means, said indicating circuit means comprising:
        a plurality of indicator lights connected to said plurality of defect sensing means; and
        transistor circuit means for controlling the supply of electric current to said plurality of indicator lights in response to said signal from said plurality of defect sensing means for turning on one of said plurality of indicator lights which indicates the location of the sensed defect;
    a control circuit means including a manually-operated triggerable switch means for generating a control signal when said switch means is manually triggered;
    a warning circuit means including a warning element for producing a warning whenever one or more of said defect sensing means senses a defect in a sensed function and for producing a less bothersome warning whenever one or more of said defect sensing means senses a defect in a sensed function and a control signal is generated by said control circuit; and
    discriminating circuit means responsive to predetermined ones of said plurality of defect sensing means for preventing said control circuit means from producing a control signal by which said warning element is made to provide a less bothersome warning whenever one of said predetermined defect sensing means senses a defect.

2. An electronic monitor system as in claim 1, wherein said plurality of defect sensing means comprises a switching means which opens when there is a defect in said sensed function.

3. An electronic monitor system as claimed in claim 1, wherein said warning circuit means comprises a nonstable multivibrator means responsive to one or more signals produced by said defect sensing means whenever there is a defect in a sensed function, and wherein said warning element comprises a warning light connected to the output of said nonstable multivibrator means.

4. An electronic monitor system as claimed in claim 3 wherein the input of said warning circuit is coupled via OR circuit means to the outputs of said indicating circuit means.

5. An electronic monitor system as claimed in claim 4 wherein said OR circuit means includes a plurality of diodes.

6. An electronic system as claimed in claim 1, wherein said control circuit means comprises transistor means whose collector is coupled to said warning element and which turns on when said triggerable switch means is manually triggered.

7. An electronic monitor system as claimed in claim 6 wherein said transistor means of said control circuit further comprises resistor means coupled between said collector of said transistor means and said warning element for lowering the strength of said warning whenever said triggerable switch means is manually triggered, thereby making said warning less bothersome to an operator of the vehicle.

8. An electronic monitor system as claimed in claim 1, wherein said discriminating circuit means comprises OR circuit means having diodes each coupled to the collector of said transistor circuit means of said indicating circuit means coupled to said predetermined defect sensing means.

9. An electronic monitor system as claimed in claim 1, wherein said warning element comprises a sound buzzer.

10. An electronic monitor system according to claim 1 wherein said warning element comprises a lamp.

11. An electronic monitor system according to claim 10 wherein the brightness of said lamp is reduced to a lower value, said control signal generated by said control circuit.

12. An electronic monitor system according to claim 3 wherein said warning light is coupled to the output terminal on said nonstable multivibrator through a parallel circuit comprising a resistor to restrict the amount of electric current therethrough to reduce the brightness of said warning light and a by-pass circuit including a transistor which in response to said control signal becomes nonconductive.

* * * * *